(12) United States Patent
Ahari et al.

(10) Patent No.: US 9,311,411 B2
(45) Date of Patent: Apr. 12, 2016

(54) PROCESSING SOCIAL SEARCH RESULTS

(75) Inventors: Sanaz Ahari, Bellevue, WA (US);
Timothy C. Hoad, Redmond, WA (US);
Deepak Vijaywargi, Seattle, WA (US);
Yatharth Saraf, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 454 days.

(21) Appl. No.: 13/218,418

(22) Filed: Aug. 25, 2011

(65) Prior Publication Data

US 2013/0054587 A1 Feb. 28, 2013

(51) Int. Cl.
*G06F 7/00* (2006.01)
*G06F 17/30* (2006.01)

(52) U.S. Cl.
CPC .................. *G06F 17/30867* (2013.01)

(58) Field of Classification Search
None
See application file for complete search history.

(56) References Cited

U.S. PATENT DOCUMENTS

| | | | |
|---|---|---|---|
| 7,890,501 B2 | 2/2011 | Lunt et al. | |
| 8,386,469 B2* | 2/2013 | Reuther et al. | 707/715 |
| 2009/0228439 A1* | 9/2009 | Manolescu et al. | 707/3 |
| 2009/0276421 A1* | 11/2009 | Qiu | 707/5 |
| 2009/0282002 A1 | 11/2009 | Reeder et al. | |
| 2009/0307205 A1 | 12/2009 | Churchill et al. | |
| 2010/0153215 A1* | 6/2010 | Abraham | 705/14.55 |
| 2010/0223546 A1* | 9/2010 | Liu | 715/243 |
| 2010/0306249 A1* | 12/2010 | Hill et al. | 707/769 |
| 2011/0093346 A1* | 4/2011 | Lunt et al. | 705/14.71 |
| 2012/0047147 A1* | 2/2012 | Redstone et al. | 707/748 |
| 2012/0078884 A1* | 3/2012 | Callari et al. | 707/722 |
| 2012/0089588 A1* | 4/2012 | Gollapudi et al. | 707/706 |
| 2012/0158747 A1* | 6/2012 | Satow et al. | 707/748 |
| 2012/0310929 A1* | 12/2012 | Patterson et al. | 707/728 |
| 2012/0317109 A1* | 12/2012 | Richter et al. | 707/734 |

OTHER PUBLICATIONS

"Use Bing Social to Search Facebook and Twitter", Retrieved at <<http://www.bing.com/community/site_blogs/b/search/archive/2010/06/09/use-bing-social-to-search-facebook-and-twitter.aspx>>, Retrieved Date: May 31, 2011, p. 1.
"Folowen: Quick Social Profile Search", Retrieved at <<http://www.makeuseof.com/dir/folowen-social-profile-search/>>, Retrieved Date: May 31, 2011, pp. 3.

(Continued)

*Primary Examiner* — Kimberly Wilson
(74) *Attorney, Agent, or Firm* — Dave Ream; Danielle Johnston-Holmes; Micky Minhas

(57) ABSTRACT

Techniques are described herein for processing social search results. Such social search results may be included in a relatively higher-ranked (e.g., a highest-ranked) subset of a user's search results and/or selected from a relatively lower-ranked subset of the user's search results in response to a determination that the relatively higher-ranked subset includes social search result(s). In one example, the social search results (or a subset thereof) may be annotated to include publicly available rich metadata. Such metadata may be extracted from user profiles on social networking domains from which the social search results are received. In another example, the social search results (or a subset thereof) may be clustered such that they are consecutively ranked. In yet another example, the social search results (or a subset thereof) may be configured to be displayed in a designated arrangement (e.g., in a grid having multiple columns).

20 Claims, 8 Drawing Sheets

(56) References Cited

OTHER PUBLICATIONS

"Google Social Search: Followers and Follows", Retrieved at <<http://beantin.se/post/3367855403/google-social-search-implications>>, Retrieved Date: May 31, 2011, pp. 4.

"Bing, Facebook & Social Search: What it Means for Local Business Marketing", Retrieved at <<http://blog.getreachcast.com/135479/2011/05/26/bing-facebook--social-search-what-it-means-for-local-business-marketing.html>>, Retrieved Date: May 31, 2011, pp. 3.

* cited by examiner

PROCESSING SOCIAL SEARCH RESULTS

BACKGROUND

A search engine is a type of program that may be hosted and executed by a server. A server may execute a search engine to enable users to search for documents in a networked computer system based on search queries that are provided by the users. For instance, the server may match search terms (e.g., keywords) that are included in a user's search query to metadata associated with documents that are stored in (or otherwise accessible to) the networked computer system. Documents that are retrieved in response to the search query are provided to the user as respective search results. The documents are often ranked based on how closely their metadata matches the search terms. For example, the documents may be listed in an order that corresponds to the rankings of the respective documents. The document having the highest ranking is usually listed first in the search result.

One type of search result is referred to as a social search result. A social search result is a search result that is received from a social networking domain (e.g., a social networking Web site). Examples of a social networking domain include but are not limited to Badoo®, Bebo®, Classmates.com®, Habbo®, Facebook®, Linkedin®, Myspace®, Orkut®, Qzone®, Renren™, Vkontakte™, etc. Each social search result typically indicates information from a user profile on a social networking domain.

Search engines traditionally are not capable of distinguishing social search results from other types of search results. Moreover, if a user's search query results in multiple social search results that are associated with different people who have the same name, the user may not be able to distinguish information regarding a particular person for whom the user is searching from information regarding the other people who have the same name. Accordingly, the user may perform multiple search queries, click multiple social search results, and/or access a third-party domain to perform additional searching to find information regarding the particular person for whom the user is searching.

SUMMARY

Various approaches are described herein for, among other things, processing social search results. An example method is described in which an initial subset of search results that are retrieved based on a search query is determined. Each search result in the initial subset has a relevance with regard to the search query that exceeds a relevance threshold. A determination is made that the initial subset includes first social search result(s). Each first social search result indicates information from a user profile on a social networking domain. Second social search result(s) are selected from the search results based on each of the second social search result(s) indicating information from a user profile on a social networking domain. Each second social search result has a relevance with regard to the search query that does not exceed the relevance threshold. A designated subset of the second social search result(s) and at least a portion of the initial subset that includes the first social search result(s) are combined to provide a presentation subset of the search results that is to be presented to a user that is associated with the search query.

Another example method is described. In accordance with this method, search results that are retrieved in response to a search query are ranked based on a relevance of each of the search results with respect to the search query to provide rankings of the respective search results. A relatively greater ranking corresponds to a relatively greater relevance with respect to the search query. A relatively lower ranking corresponds to a relatively lower relevance with respect to the search query. An initial subset of the search results is determined. Each search result in the initial subset has a ranking that exceeds a ranking threshold, A determination is made that the initial subset includes social search results. Each social search result indicates information from a user profile on a social networking domain. The social search results include at least a first subset and a second subset. The first subset includes first social search result(s) having respective first ranking(s). The second subset includes second social search result(s) having respective second ranking(s). A determination is made that the first ranking(s) and the second ranking(s) are not consecutive. The second ranking(s) are increased to be consecutive with the first ranking(s) in response to determining that the first ranking(s) and the second ranking(s) are not consecutive.

An example system is described that includes subset determination logic, social determination logic, selection logic, and combination logic. The subset determination logic is configured to determine an initial subset of search results that are retrieved based on a search query. Each search result in the initial subset has a relevance with regard to the search query that exceeds a relevance threshold. The social determination logic is configured to determine whether the initial subset includes first social search result(s). Each first social search result indicates information from a user profile on a social networking domain. The selection logic is configured to select second social search result(s) from the search results based on each of the second social search result(s) indicating information from a user profile on a social networking domain, in response to a determination that the initial subset includes the first social search result(s). Each second social search result has a relevance with regard to the search query that does not exceed the relevance threshold. The combination logic is configured to combine a designated subset of the second social search result(s) and at least a portion of the initial subset that includes the first social search result(s) to provide a presentation subset of the search results that is to be presented to a user that is associated with the search query.

Another example system is described. The system includes ranking logic, subset determination logic, social determination logic, and consecutive determination logic. The ranking logic is configured to rank search results that are retrieved in response to a search query based on a relevance of each of the search results with respect to the search query to provide rankings of the respective search results. A relatively greater ranking corresponds to a relatively greater relevance with respect to the search query. A relatively lower ranking corresponds to a relatively lower relevance with respect to the search query. The subset determination logic is configured to determine an initial subset of the search results. Each search result in the initial subset has a ranking that exceeds a ranking threshold. The social determination logic is configured to determine whether the initial subset includes social search results. Each social search result indicates information from a user profile on a social networking domain. The consecutive determination logic is configured to determine whether first ranking(s) of respective first social search result(s) and second ranking(s) of respective second social search result(s) are consecutive in response to a determination that the initial subset includes the social search results. A first subset of the social search results includes the first social search result(s). A second subset of the social search results includes the second social search result(s). The ranking logic is further configured to increase the second ranking(s) to be consecutive with the first ranking(s) in response to a determination that the first ranking(s) and the second ranking(s) are not consecutive.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
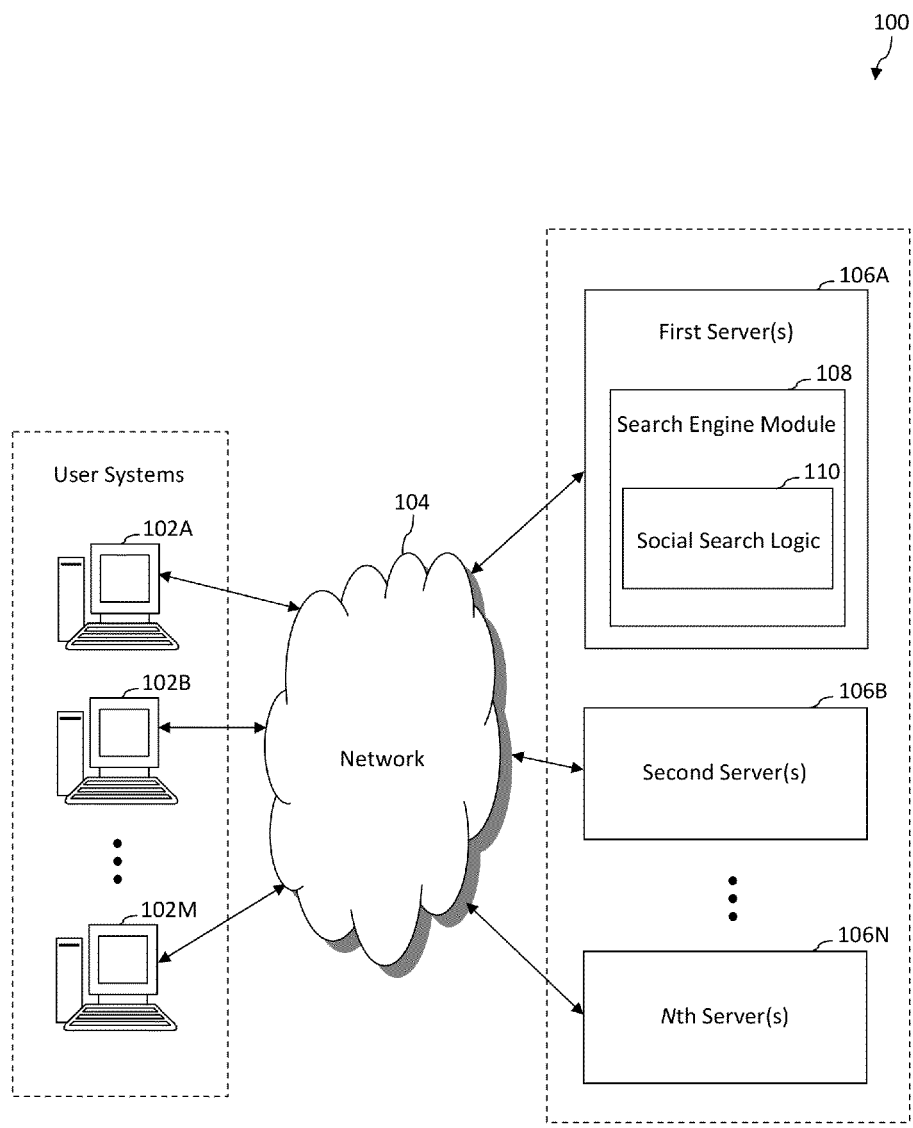
FIG. 1 is a block diagram of an example computer system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments for Processing Social Search Results

Example embodiments described herein are capable of processing social search results. Such social search results may be included in a relatively higher-ranked (e.g., a highest-ranked) subset of a user's search results and/or selected from a relatively lower-ranked subset of the user's search results in response to a determination that the relatively higher-ranked subset includes social search result(s). In one example, the social search results (or a subset thereof) may be annotated to include publicly available rich metadata. Such metadata may be extracted from user profiles on social networking domains from which the social search results are received. In another example, the social search results (or a subset thereof) may be clustered such that they are consecutively ranked. In yet another example, the social search results (or a subset thereof) may be configured to be displayed in a designated arrangement (e.g., in a grid having multiple columns).

Example techniques described herein have a variety of benefits as compared to conventional techniques for processing search results. For example, the techniques may be capable of distinguishing social search results from other types of search results. The presence of multiple social search results in a user's search results may imply an intent by the user to find information regarding a particular person. When social search result(s) are identified in search results that are selected for presentation on a search engine results page (SERP), for example, additional social search results and/or publicly available rich metadata may be extracted from social networking domains for inclusion on the SERF. For example, the techniques may be capable of exceeding a pre-defined limit regarding a number of search results that are allowed to be selected for presentation on the SERF from the same domain. In accordance with this example, the techniques may enable more social search results from each social networking domain than the pre-defined limit to be selected for presentation on the SERP in response to a determination that the search results include one or more social search results. The techniques may be capable of grouping the social search results for presentation to a user based on heuristics and/or metadata that is associated with the social search results. The techniques may be capable of determining placement of the social search results on the SERF based on such metadata. For example, the metadata that is associated with the social search results may be used to map a person's profile page from one social networking domain to another. In accordance with this example, information from the person's various profile pages may be aggregated to present a summary of the person's profile.

FIG. 1 is a block diagram of an example computer system 100 in accordance with an embodiment. Generally speaking, computer system 100 operates to provide information to users in response to requests (e.g., hypertext transfer protocol (HTTP) requests) that are received from the users. The information may include documents (e.g., Web pages, images, video files, etc.), output of executables, and/or any other suitable type of information. For instance, user system 100 may provide search results in response to search queries that are provided, by users. According to example embodiments, computer system 100 operates to process social search results that are included in such search results. Further detail regarding techniques for processing social search results is provided in the following discussion.

As shown in FIG. 1, computer system 100 includes a plurality of user systems 102A-102M, a network 104, and a plurality of servers 106A-106N. Communication among user systems 102A-102M and servers 106A-106N is carried out over network 104 using well-known network communication protocols. Network 104 may be a wide-area network (e.g., the Internet), a local area network (LAN), another type of network, or a combination thereof.

User systems 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. User systems 102A-102M are configured to provide requests to servers 106A-106N for requesting information stored on (or otherwise accessible via) servers 106A-106N. For instance, a user may initiate a request for information using a client (e.g., a Web browser, Web crawler, or other type of client) deployed on a user system 102 that is owned by or otherwise accessible to the user. In accordance with some example embodiments, user systems 102A-102M are capable of accessing domains (e.g., Web sites) hosted by servers 104A-104N, so that user systems 102A-102M may access information that is available via the Web sites. Such Web sites include Web pages, which may be provided as hypertext markup language (HTML) documents and objects (e.g., files) that are linked therein, for example.

It will be recognized that any one or more user systems 102A-102M may communicate with any one or more servers 106A-106N. Although user systems 102A-102M are depicted as desktop computers in FIG. 1, persons skilled in the relevant art(s) will appreciate that user systems 102A-102M may include any client-enabled system or device, including but not limited to a desktop computer, a laptop computer, a tablet computer, a personal digital assistant, a cellular telephone, or the like.

Servers 106A-106N are processing systems that are capable of communicating with user systems 102A-102M. Servers 106A-106N are configured to execute software programs that provide information to users in response to receiving requests from the users. For example, the information may include documents (e.g., Web pages, images, video files, etc.), output of executables, or any other suitable type of information. In accordance with some example embodiments, servers 106A-106N are configured to host respective Web sites, so that the Web sites are accessible to users of computer system 100.

One type of software program that may be executed by any one or more of servers 106A-106N is a search engine. A search engine is executed by a server to search for information in a networked computer system based on search queries that are provided by users. First server(s) 106A is shown to include search engine module 108 for illustrative purposes. Search engine module 108 is configured to execute a search engine. For instance, search engine module 108 may search among servers 106A-106N for requested information. Upon determining instances of information that are relevant to a user's search query, search engine module 108 provides the instances of the information as search results to the user. Search engine module 108 may rank the search results based on their relevance to the search query. For instance, search engine module 108 may list the search results in an order that is based on their respective rankings.

Search engine module 108 includes social search logic 110. Social search logic 110 is configured to process social search results. For example, when search engine module 108 retrieves search results in response to a user's search query, social search logic 110 determines an initial subset of the search results such that each search result in the initial subset has a relevance with regard to the search query that exceeds a relevance threshold. In accordance with this example, social search logic 110 determines whether the initial subset includes social search result(s).

In some example embodiments, upon determining that the initial subset includes social search result(s), social search logic 110 selects additional social search result(s) from the search results based on each of the additional search result(s) indicating information from a user profile on a social networking domain. Each of the additional social search result(s) has a relevance with regard to the search query that does not exceed the relevance threshold. Social search logic 110 combines a specified subset of the additional social search result (s) and the social search result(s) from the initial subset to provide a presentation subset of the search results that is to be presented to a user that is associated with the search query.

In other example embodiments, social search logic 110 ranks the search results based on the relevance of each search result with respect to the search query to provide rankings of the respective search results. A relatively greater ranking corresponds to a relatively greater relevance, and a relatively lower ranking corresponds to a relatively lower relevance, in accordance with these embodiments, social search logic 110 determines whether social search results from among the initial subset and/or the specified subset have consecutive rankings. Upon determining that such social search results do not have consecutive rankings, social search logic 110 re-ranks one or more of the social search results so that the rankings of the social search results are consecutive. For instance, if a specified social search result has a highest ranking of the social search results, social search logic 110 may increase rankings of social search results other than the specified social search result from among the initial subset and/or the specified subset to provide a series of consecutively ranked social search results.

It will be recognized that social search logic 110 may be implemented in various ways to process social search results, including being implemented in hardware, software, firmware, or any combination thereof. For example, social search logic 110 may be implemented as computer program code configured to be executed in one or more processors. In another example, social search logic 110 may be implemented as hardware logic/electrical circuitry. In an embodiment, social search logic 110 may be implemented in a system-on-chip (SoC). Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Some example techniques for processing social search results are discussed in greater detail below with reference to FIGS. 2-4, 5A, 5B, and 6.

Figure 2:
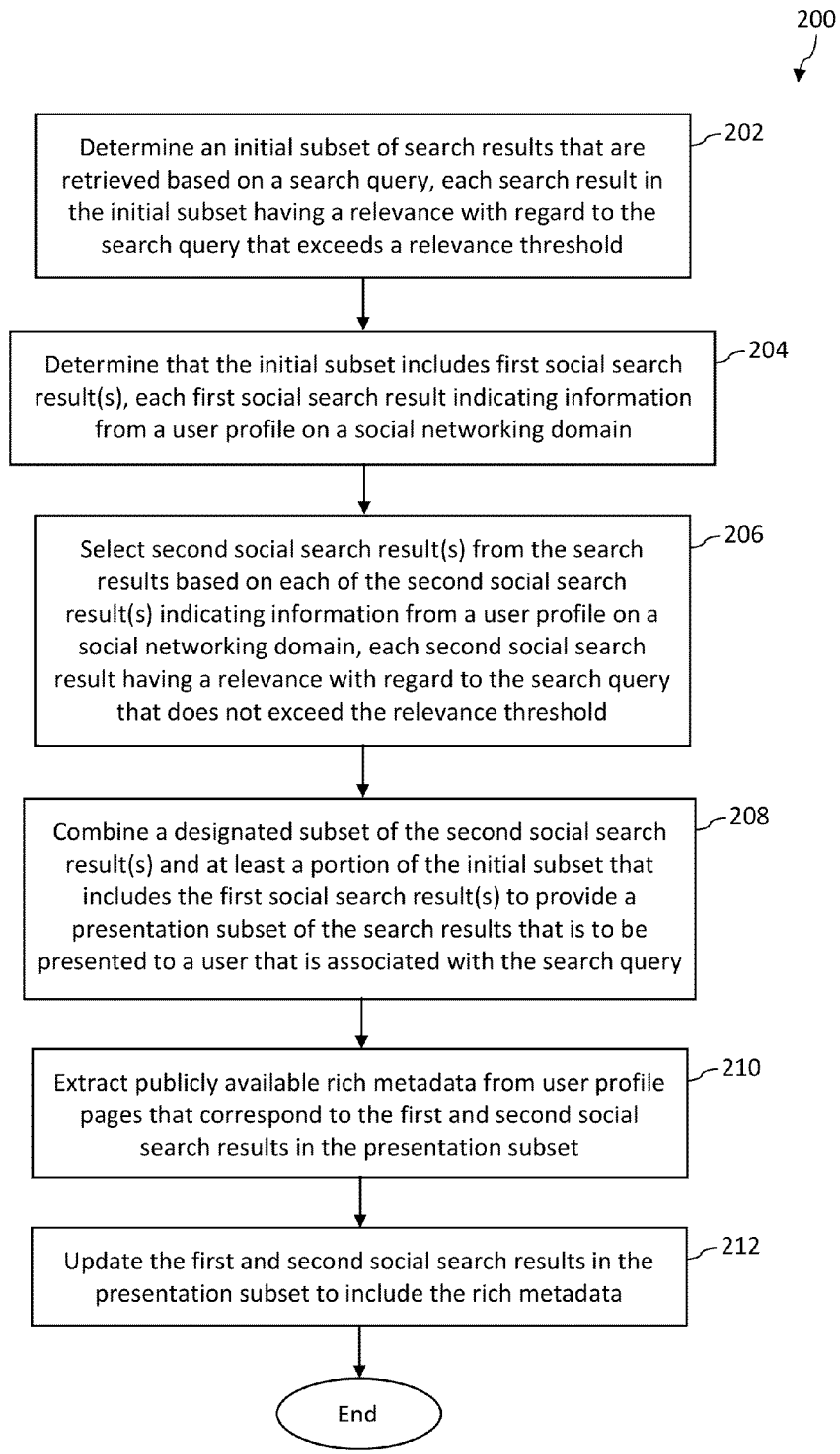
FIGS. 2 and 3 depict flowcharts of methods for processing social search results in accordance with embodiments.
Figure 3:
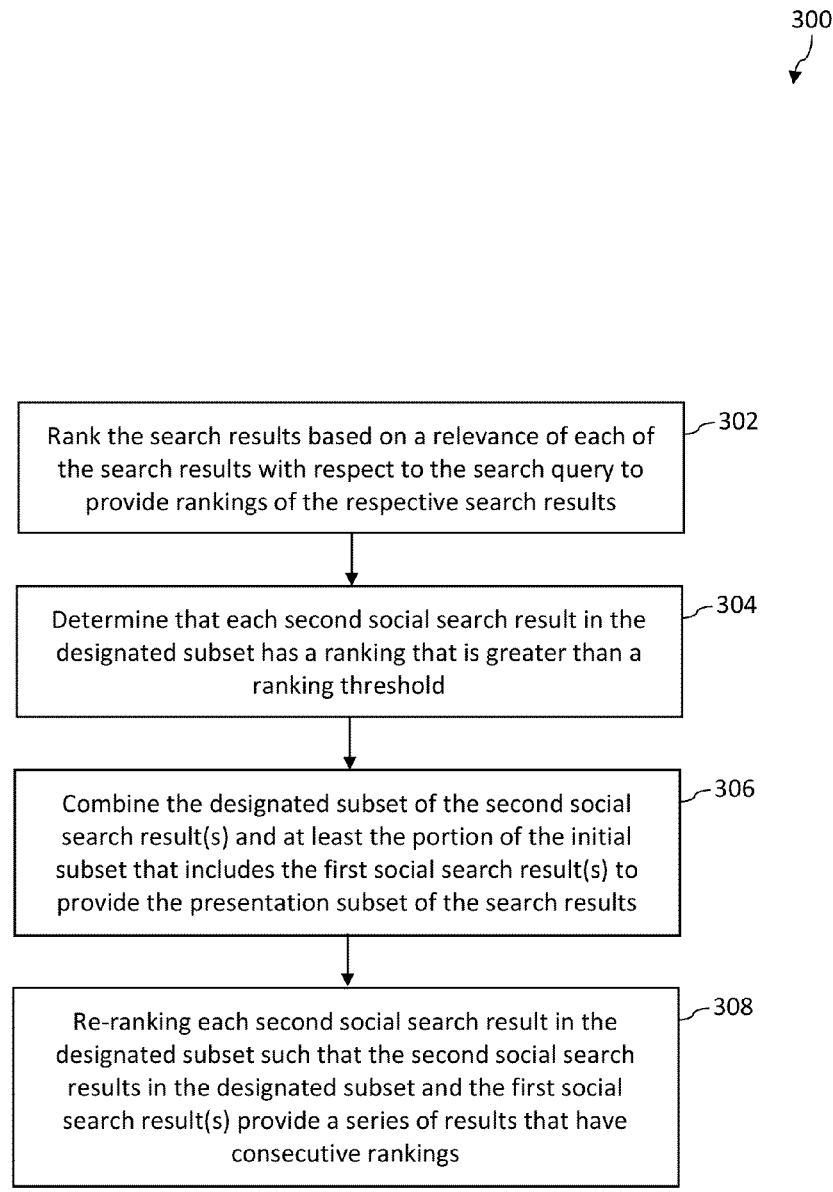
Figure 4:
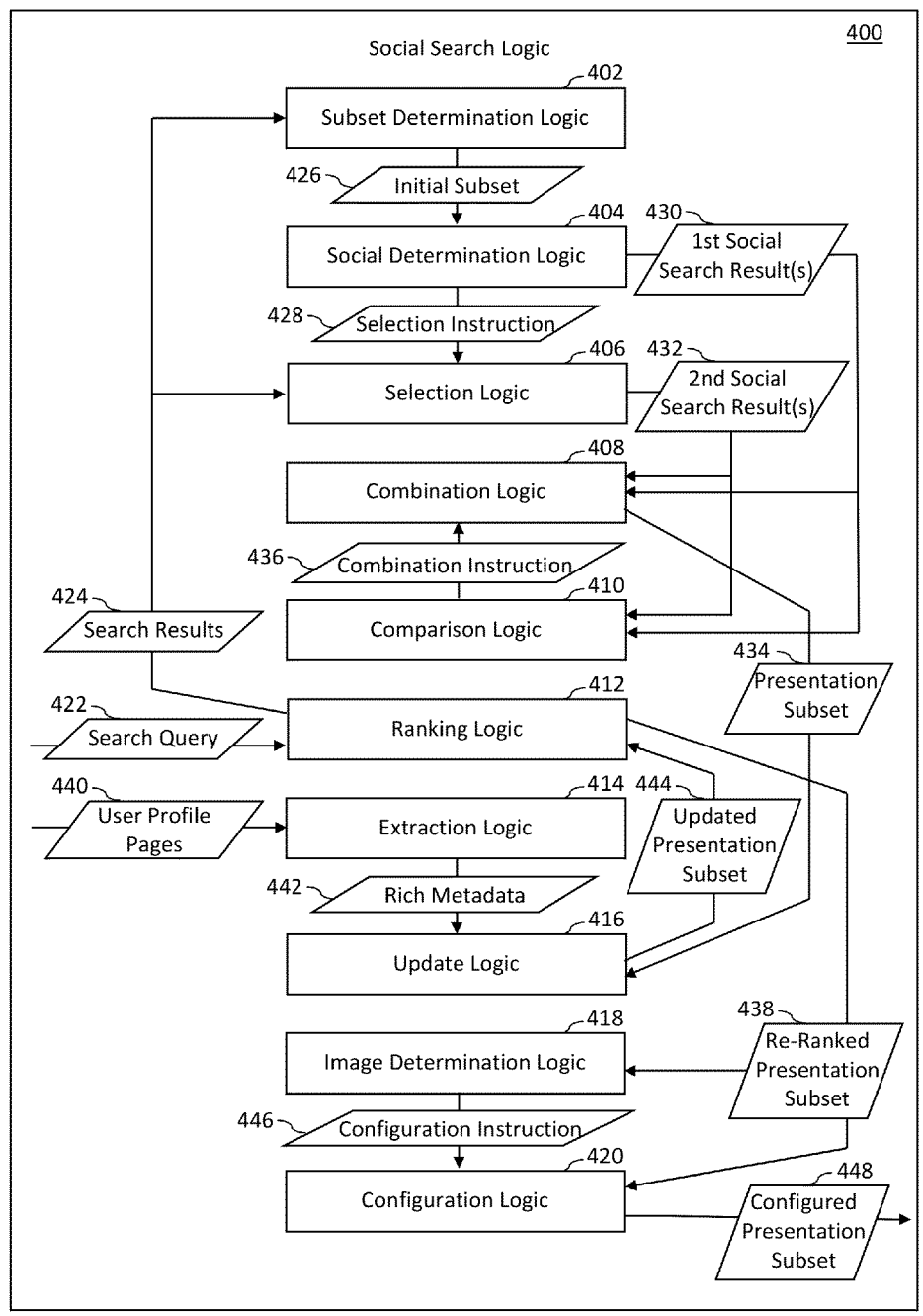
FIGS. 4 and 6 are block diagrams of example implementations of social search logic shown in FIG. 1 in accordance with embodiments.

FIGS. 2 and 3 depict flowcharts 200 and 300 of methods for processing social search results in accordance with embodiments. Flowcharts 200 and 300 may be performed by social search logic 110 of computer system 100 shown in FIG. 1, for example. For illustrative purposes, flowcharts 200 and 300 are described with respect to social search logic 400 shown in FIG. 4, which is an example of social search logic 110, according to an embodiment. As shown in FIG. 4, social search logic 400 includes subset determination logic 402, social determination logic 404, selection logic 406, combination logic 408, comparison logic 410, ranking logic 412, extraction logic 414, update logic 416, image determination logic 418, and configuration logic 420. Further structural and operational embodiments will be apparent to persons skilled in the relevant art(s) based on the discussion regarding flowcharts 200 and 300. Flowcharts 200 and 300 are described as follows.

As shown in FIG. 2, the method of flowchart 200 begins at step 202. In step 202, an initial subset of search results that are retrieved based on a search query is determined. Each search result in the initial subset has a relevance with regard to the search query that exceeds a relevance threshold. In an example implementation, subset determination logic 402 determines an initial subset 426 of search results 424 that are retrieved based on a search query 422. For instance, ranking logic 412 may retrieve the search results 424 in response to receipt of the search query 422.

At step 204, a determination is made that the initial subset includes first social search result(s). Each first social search result indicates information from a user profile on a social networking domain. For instance, the first social search results may be derived from user profile pages on a plurality of social networking domains. In an example implementation, social determination logic 404 determines that the initial subset 426 includes first social search results 430. In accordance with this implementation, social determination logic 404 may generate a selection instruction 428 that instructs selection logic 406 to select second social search result(s) 432 from the search results 424.

At step 206, second social search result(s) are selected from the search results based on each of the second social search result(s) indicating information from a user profile on a social networking domain. It will be recognized that if multiple second social search results are selected at step 206, each of the second social search results may be derived from a user profile page on the same social networking domain or a different social networking domain than a user profile page form which another second social search result is derived. Each second social search result has a relevance with regard to the search query that does not exceed the relevance threshold. In an example implementation, selection logic 406 selects the second social search result(s) 432 from the search results 424. For instance, selection logic 406 may select the second social search result(s) 432 in response to receipt of the selection instruction 428.

At step 208, a designated subset of the second social search result(s) and at least a portion of the initial subset that includes the first social search result(s) are combined to provide a presentation subset of the search results that is to be presented to a user that is associated with the search query. For instance, the presentation subset may be presented to the user on a search engine results page (SERF). In an example implementation, combination logic 408 combines a designated subset of the second social search result(s) 432 and at least the portion of the initial subset 426 that includes the first social search result(s) 430 to provide a presentation subset 434 of the search results 424.

Step 208 may be performed in response to any of a variety of triggering events, though the scope of the embodiments is not limited in this respect. For example, a determination may be made that a quantity of the first social search result(s) exceeds a designated threshold, in accordance with this embodiment, step 208 may be performed based on the quantity of the first social search result(s) exceeding the designated threshold. In an example implementation, comparison logic 410 determines that a quantity of the first social search result(s) 430 exceeds the designated threshold, in accordance with this implementation, comparison logic 410 may generate a combination instruction 436 that instructs combination logic 408 to combine the designated subset of the second social search result(s) 432 and at least the portion of the initial subset 426 that includes the first social search result(s) 430 in response to determining that the quantity of the first social search result(s) 430 exceeds the designated threshold. Combination logic 408 may combine the designated subset of the second social search result(s) 432 and at least the portion of the initial subset 426 that includes the first social search result(s) 430 in response to receipt of the combination instruction 436.

In another example, a determination may be made that one or more (e.g., all) of the second social search result(s) have respective relevance(s) with regard to the search query that exceed a combination threshold that is less than the relevance threshold. In accordance with this example, step 208 may be performed based on the one or more aforementioned second social search result(s) having respective relevance(s) with regard to the search query that exceed the combination threshold. In an example implementation, comparison logic 410 determines that one or more of the second social search result(s) have respective relevance(s) with regard to the search query 422 that exceed the combination threshold. In accordance with this implementation, comparison logic 410 may generate the combination instruction 436 that instructs combination logic 408 to combine the designated subset of the second social search result(s) 432 and at least the portion of the initial subset 426 that includes the first social search result(s) 430 in response to determining that one or more of the second social search result(s) have respective relevance(s) with regard to the search query 422 that exceed the combination threshold. Combination logic 408 may combine the designated subset of the second social search result(s) 432 and at least the portion of the initial subset 426 that includes the first social search result(s) 430 in response to receipt of the combination instruction 436.

At step 210, publicly available rich metadata is extracted from user profile pages that correspond to the first and second social search results in the presentation subset. For instance, the publicly available metadata may be extracted from user profile pages from which the first and second social search results in the presentation subset are derived. Examples of information identified in rich metadata that may be publicly available include but are not limited to a geographic region that is associated with a person with whom a user profile from which the rich metadata is extracted corresponds, a job title and/or an employer with which the person is associated, a school that is currently or previously attended by the person, profile picture(s) of the person, friend(s) of the person, etc. A geographic region that is associated with a person may include a city, county, state, country, and/or other geographic region in which the person currently lives and/or works, previously lived and/or worked, was born, currently and/or previously attended school, etc. The publicly available rich metadata may enable a user who issued the search query to disambiguate the first and second social search results in the presentation subset. The rich metadata that is publicly available from each user profile page may be selected to be publicly available by the person with whom the user profile page corresponds (e.g., the person who created the user profile page). Templates may be used for automatically extracting the publicly available rich metadata from the user profile pages. For instance, each social domain may correspond to a respective template. In an example implementation, extraction logic 414 extracts rich metadata 442 from at least user profile pages 440 that correspond to the first and second social search results in the presentation subset 434.

At step 212, the first and second social search results are updated in the presentation subset to include the rich metadata. In an example implementation, update logic 416 updates the first and second social search results in the presentation subset 434 to include the rich metadata 442 to provide an updated presentation subset 444 of the search results 424.

In an example embodiment, the presentation subset is configured to cause the first and second social search results therein to be displayed in a grid, that includes a multiple columns. The grid may include any suitable number (e.g., one, two, three, etc.) of rows. In an example implementation, configuration logic 420 configures presentation subset 434, updated presentation subset 444, or a re-ranked presentation subset 438 (discussed below) to cause the first and second social search results therein to be displayed in a grid that includes multiple columns, resulting in a configured presentation subset 448.

In an aspect of the aforementioned embodiment, a determination may be made that each of the first and second social search results in the presentation subset includes an image of a user that is associated therewith. In accordance with this aspect, the presentation subset may be configured to cause the first and second social search results therein to be displayed in the grid in response to determining that each of the first and second social search results in the presentation subset includes an image of a user that is associated therewith.

In an example implementation, image determination logic 418 determines whether each of the first and second social search results in the presentation subset 434, the updated presentation subset 444, or the re-ranked presentation subset 438 includes an image of a user that is associated with the respective social search result. For instance, image determination logic 418 may detect an image (e.g., a dominant image) with respect to a user profile, crawl the image (e.g., in accordance with a web crawling technique), index the image for subsequent retrieval, create a thumbnail image based on the image, store each thumbnail image in a thumbnail server for subsequent retrieval, update each image and/or thumbnail image on a fixed periodic basis and/or each time one or more steps of flowchart 200 are performed, etc. In accordance with this implementation, image determination logic 418 may generate a configuration instruction 446 that instructs configuration logic 420 to configure the presentation subset 434, the updated presentation subset 444, or the re-ranked presentation subset 438 to cause the first and second social search results therein to be displayed in a grid in response to determining that each of the first and second social search results in the presentation subset 434, the updated presentation subset 444, or the re-ranked presentation subset 438 includes such an image. Configuration logic 420 may configure the presentation subset 434, the updated presentation subset 444, or the re-ranked presentation subset 438 to cause the first and second social search results therein to be displayed in a grid in response to receipt of the configuration instruction 446.

In some example embodiments, one or more steps 202, 204, 206, 208, 210, and/or 212 of flowchart 200 may not be performed. Moreover, steps in addition to or in lieu of steps 202, 204, 206, 208, 210, and/or 212 may be performed.

In an example embodiment, instead of performing step 208 of flowchart 200, the steps shown in flowchart 300 are performed. As shown in FIG. 3, the method of flowchart 300 begins at step 302. In step 302, the search results are ranked based on a relevance of each of the search results with respect to the search query to provide rankings of the respective search results. In accordance with this embodiment, a relatively greater ranking corresponds to a relatively greater relevance with respect to the search query. A relatively lower ranking corresponds to a relatively lower relevance with respect to the search query. In an example implementation, ranking logic 412 ranks the search results 424 based on the relevance of each of the search results 424 with respect to the search query 422.

At step 304, a determination is made that each second social search result in the designated subset has a ranking that is greater than a ranking threshold. For example, the ranking threshold may be a fixed threshold. In another example, the ranking threshold may be a relative threshold with reference to a ranking of a first social search result (e.g., a highest ranked first social search result). In an example implementation, comparison logic 410 determines that each second social search result in the designated subset has a ranking that is greater than the ranking threshold.

At step 306, the designated subset of the second social search result(s) and at least the portion of the initial subset that includes the first social search result(s) are combined to provide the presentation subset of the search results. In an example implementation, combination logic 408 combines the designated subset of the second social search result(s) 432 and at least the portion of the initial subset 426 that includes the first social search result(s) 430 to provide the presentation subset 434 of the search results 424.

At step 308, each second social search result in the designated subset is re-ranked such that the second social search results in the designated subset and the first social search result(s) provide a series of results that have consecutive rankings. In an example implementation, ranking logic 412 re-ranks each second social search result in the designated subset such that the second social search results in the designated subset and the first social search result(s) 430 provide the re-ranked presentation subset 438 to include a series of results that have consecutive rankings.

In some example embodiments, one or more steps 302, 304, 306, and/or 308 of flowchart 300 may not be performed. Moreover, steps in addition to or in lieu of steps 302, 304, 306, and/or 308 may be performed.

It will be recognized that social search logic 400 may not include one or more of subset determination logic 402, social determination logic 404, selection logic 406, combination logic 408, comparison logic 410, ranking logic 412, extraction logic 414, update logic 416, image determination logic 418, and/or configuration logic 420. Furthermore, social search logic 400 may include logic in addition to or in lieu of subset determination logic 402, social determination logic 404, selection logic 406, combination logic 408, comparison logic 410, ranking logic 412, extraction logic 414, update logic 416, image determination logic 418, and/or configuration logic 420.

Figure 5A:
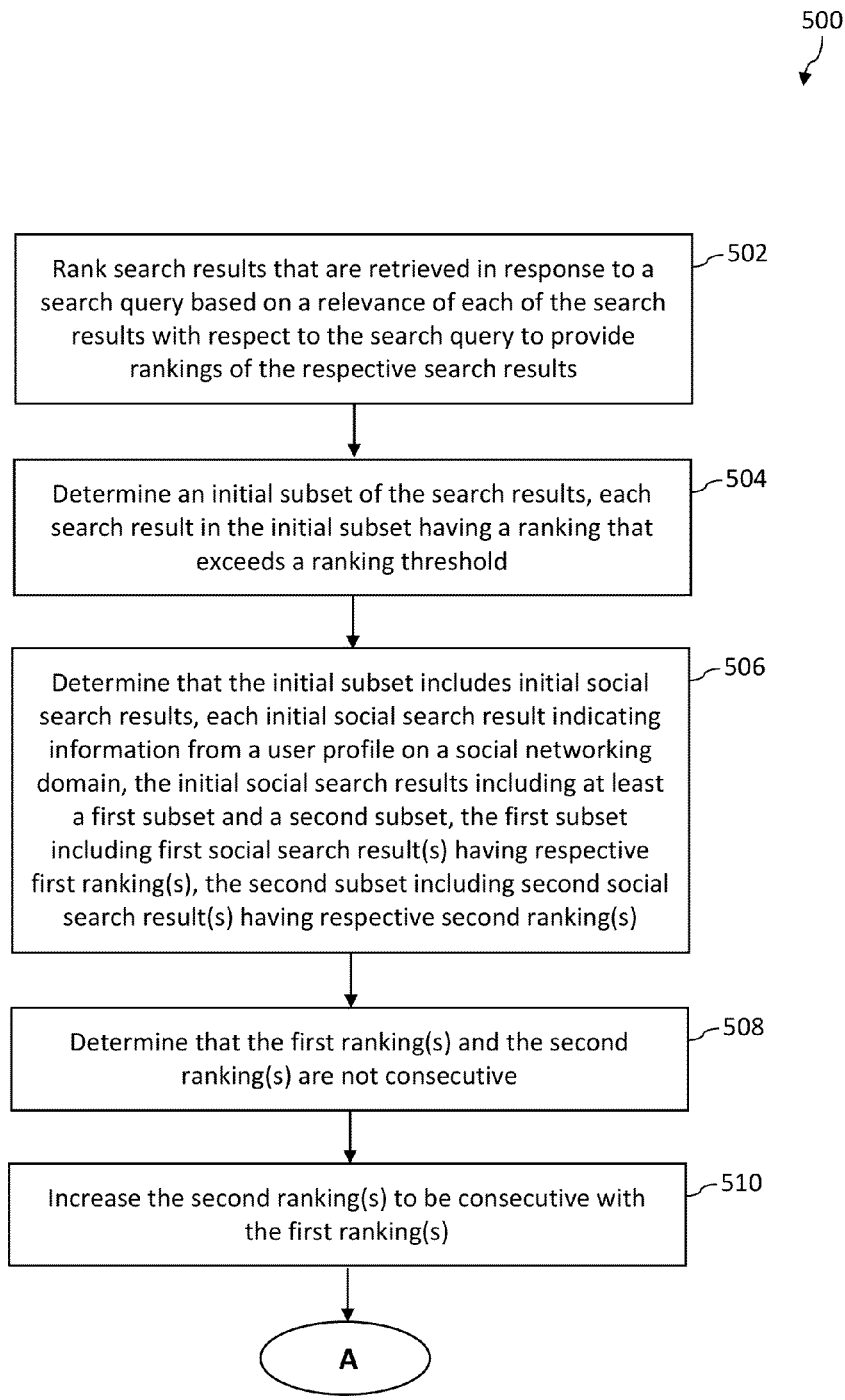
FIGS. 5A and 5B depict respective portions of a flowchart of another method for processing social search results in accordance with an embodiment.
Figure 5B:
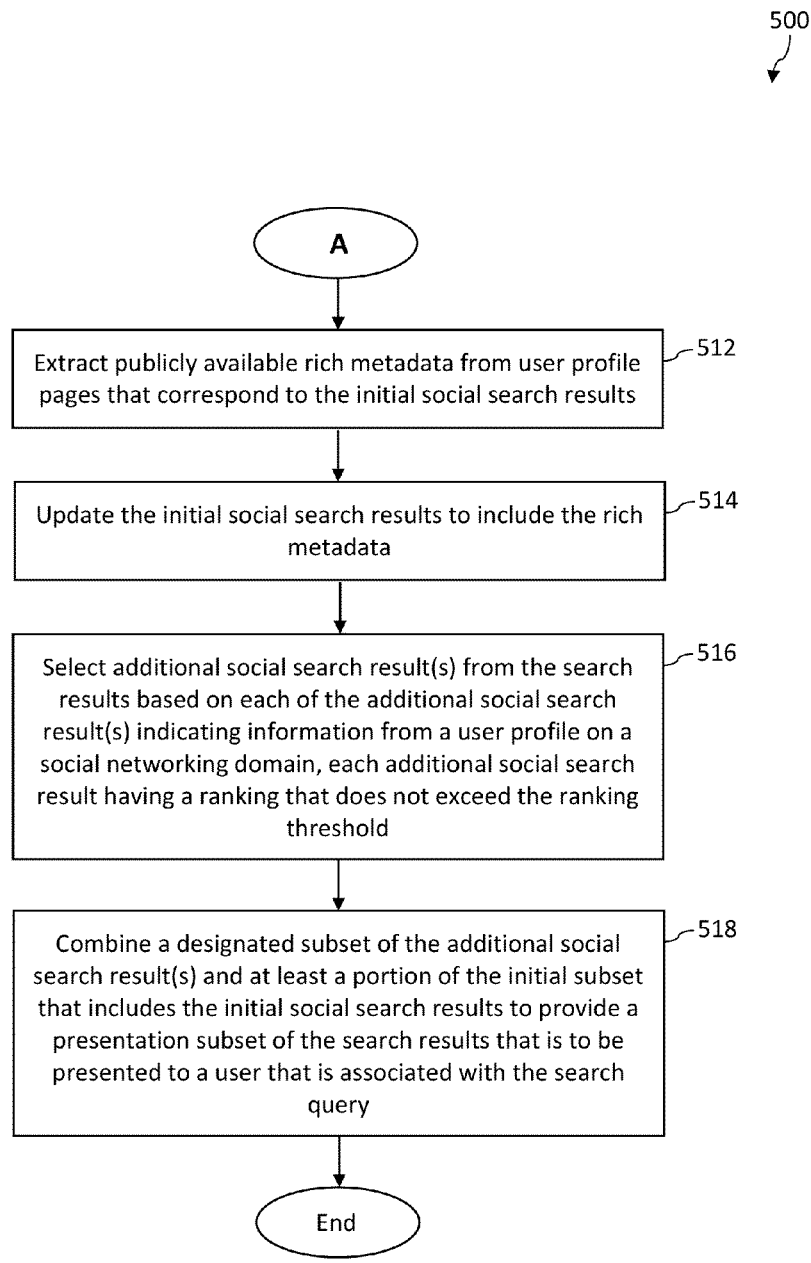
Figure 6:
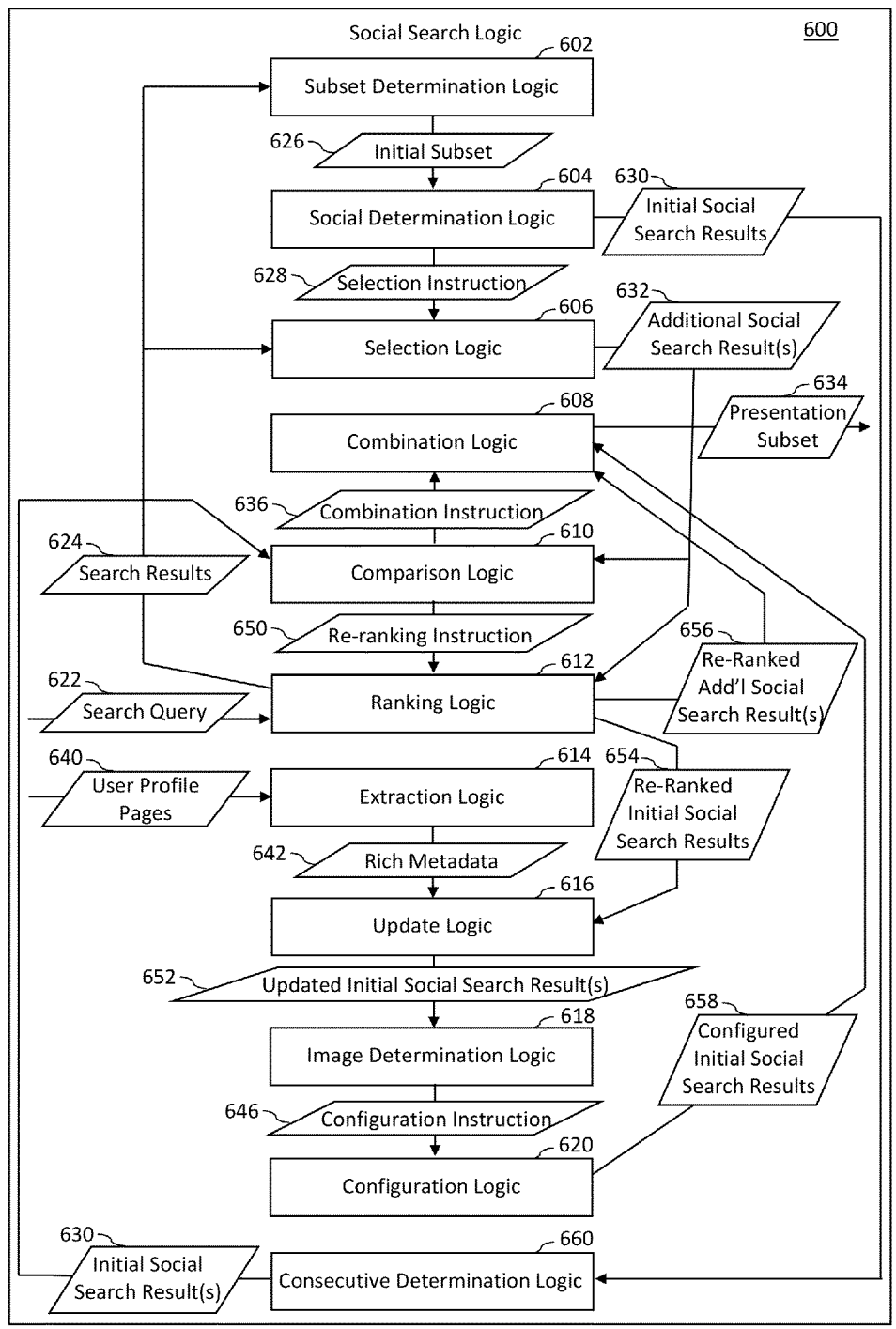

FIGS. 5A and 5B depict respective portions of a flowchart 500 of another method for processing social search results in accordance with an embodiment. Flowchart 500 may be performed by social search logic 110 of computer system 100 shown in FIG. 1, for example. For illustrative purposes, flowchart 500 is described with respect to social search logic 600 shown in FIG. 6, which is an example of social search logic 110, according to an embodiment. As shown in FIG. 6, social search logic 600 includes subset determination logic 602, social determination logic 604, selection logic 606, combination logic 608, comparison logic 610, ranking logic 612, extraction logic 614, update logic 616, image determination logic 618, configuration logic 620, and consecutive determination logic 660. Further structural and operational embodiments will be apparent to persons skilled in the relevant art(s) based on the discussion regarding flowchart 500. Flowchart 500 is described as follows.

As shown in FIG. 5A, the method of flowchart 500 begins at step 502. In step 502, search results that are retrieved in response to a search query are ranked based on a relevance of each of the search results with respect to the search query to provide rankings of the respective search results. A relatively greater ranking corresponds to a relatively greater relevance with respect to the search query. A relatively lower ranking corresponds to a relatively lower relevance with respect to the search query. In an example implementation, ranking logic 612 ranks search results 624 that are retrieved, in response to search query 622 based on a relevance of each of the search results 624 with respect to the search query 622 to provide rankings of the respective search results 624. For instance, ranking logic 612 may retrieve the search results 624 based on the search query 622.

At step 504, an initial subset of the search results is determined. Each search result in the initial subset has a ranking that exceeds a ranking threshold. In an example implementation, subset determination logic 602 determines initial subset 626 of the search results 624.

At step 506, a determination is made that the initial subset includes initial social search results. Each initial social search result indicates information from a user profile on a social networking domain. The initial social search results include at least a first subset and a second subset. The first subset includes first social search result(s) having respective first ranking(s). The second subset includes second social search result(s) having respective second ranking(s). In an example implementation, social determination logic 604 determines that the initial subset 626 includes initial social search results 630. Social determination logic 604 may generate selection instruction 628 in response to determining that the initial subset 626 includes initial social search results 630. Selection instruction 628 instructs selection logic 606 to select additional social search result(s) from the search results 624. Selection logic 606 is discussed in further detail below with reference to step 516.

At step 508, a determination is made that the first ranking(s) and the second ranking(s) are not consecutive. For instance, one or more non-social search results may have respective ranking(s) that are between the first ranking(s) and the second ranking(s). A non-social search result is a search result that is not received from a social networking domain. In an example implementation, consecutive determination logic 622 determines that the first ranking(s) and the second ranking(s) are not consecutive. For instance, consecutive determination logic 622 may analyze metadata that is associated with initial social search results 630 to determine that the first ranking(s) and the second ranking(s) are not consecutive. Upon determining that the first ranking(s) and the second ranking(s) are not consecutive, consecutive determination logic 660 may provide the initial social search result(s) 630 to comparison logic 608 for further analysis.

At step 510, the second ranking(s) are increased to be consecutive with the first ranking(s). For instance, ranking(s) of respective non-social search results that are between the first ranking(s) and the second ranking(s) may be decreased to be less than the second ranking(s). In an example implementation, ranking logic 612 increases the second ranking(s) to be consecutive with the first ranking(s) to provide re-ranked initial social search results 654.

Step 510 may be performed in response to any of a variety of triggering events, though the scope of the embodiments is not limited in this respect. For example, a determination may be made that a quantity of the initial social search results exceeds a designated threshold. In accordance with this example, step 510 may be performed based on the quantity of the initial social search results exceeding the designated threshold. In an example implementation, comparison logic 610 determines that a quantity of the initial social search results 630 exceeds the designated threshold. In accordance with this implementation, comparison logic 610 may generate a re-ranking instruction 650 that instructs ranking logic 612 to increase the second ranking(s) to be consecutive with the first ranking(s) in response to a determination that the quantity of the initial social search result 630 exceeds the designated threshold. Ranking logic 612 may increase the second ranking(s) to be consecutive with the first ranking(s) in response to receipt of the re-ranking instruction 650.

In another example, a determination may be made that at least one (e.g., all) of the second ranking(s) exceeds a second ranking threshold that is less than the first ranking threshold. In accordance with this example, step 510 may be performed based on the aforementioned at least one of the second ranking(s) exceeding the second ranking threshold. In an example implementation, comparison logic 610 determines that at least one of the second ranking(s) exceeds the second ranking threshold. In accordance with this implementation, comparison logic 610 may generate a re-ranking instruction 650 that instructs ranking logic 612 to increase the second ranking(s) to be consecutive with the first ranking(s) in response to a determination that the at least one of the second ranking(s) exceeds the second ranking threshold. Ranking logic 612 may increase the second ranking(s) to be consecutive with the first ranking(s) in response to receipt of the re-ranking instruction 650.

Upon completion of step 510, flow continues to step 512, which is shown in FIG. 5B.

At step 512, publicly available rich metadata is extracted from user profile pages that correspond to the initial social search results. In an example implementation, extraction logic 614 extracts rich metadata 642 from user profile pages 640 that correspond to the initial social search results 630.

At step 514, the initial social search results are updated to include the rich metadata. In an example implementation, update logic 616 updates the initial social search results 630, the re-ranked initial social search results 654, or configured initial social search results 658 (discussed below) to include the rich metadata to provide updated initial social search result(s) 652.

At step 516, additional social search result(s) are selected from the search results based on each of the additional social search result(s) indicating information from a user profile on a social networking domain. Each additional social search result has a ranking that does not exceed the ranking threshold. In an example implementation, selection logic 606 selects additional social search result(s) 632 from the search results 624 based on each of the additional social search result(s) 632 indicating information from a user profile on a social networking domain.

At step 518, a designated subset of the additional social search result(s) and at least a portion of the initial subset that includes the initial social search results are combined to provide a presentation subset of the search results that is to be presented to a user that is associated with the search query. In an example implementation, combination logic 608 combines the designated subset of the additional social search result(s) 632 and at least the portion of the initial subset 626 that includes the initial social search results 630 to a provide presentation subset 634 of the search results 624. It will be recognized that the designated subset may be from a changed version of the additional social search result(s) 632, such as the re-ranked additional social search result(s) 656, as shown in FIG. 6. It will be further recognized that the initial subset 626 and/or any one or more of the initial social search results 630 may be changed before step 518 is performed. For instance, step 518 may be performed with respect to at least a portion of the initial subset 626, which may include the re-ranked initial social search results 654 or the configured initial social search results 658, as shown in FIG. 6.

Step 518 may be performed in response to any of a variety of triggering events, though the scope of the embodiments is not limited in this respect. For example, a determination may be made that each of the additional social search result(s) in the designated subset has a ranking that is greater than a second ranking threshold that is less than the first ranking threshold. In accordance with this example, step 518 may be performed based on each of the additional social search result(s) in the designated subset having a ranking that is greater than the second ranking threshold. In an example implementation, comparison logic 610 determines that each of the additional social search result(s) in the designated subset has a ranking that is greater than the second ranking threshold. In accordance with this implementation, comparison logic 610 may generate a combination instruction 636 based on each of the additional social search result(s) in the designated subset having a ranking that is greater than the second ranking threshold. The combination instruction 636 instructs combination logic to combine the designated subset of the additional social search result(s) 632 or of the re-ranked additional social search result(s) 656 and at least the portion of the initial subset 626 that includes the initial social search results 630, the re-ranked initial social search results 654, or the configured initial social search results 658. Combination logic 608 may combine the designated subset and at least the portion of the initial subset 626 in response to receipt of the combination instruction 636.

In an aspect of the aforementioned example, each of the additional social search result(s) in the designated subset may be re-ranked such that the additional social search result(s) in the designated subset and the initial social search results provide a series of results that have consecutive rankings. In an example implementation, ranking logic 612 re-ranks each of the additional social search result(s) in the designated subset to provide re-ranked additional social search result(s) 656. In accordance with this implementation, combination logic 608 combines the re-ranked additional social search result(s) 656 and the initial social search results 630, the re-ranked initial social search results 654, or the configured initial social search results 658 to provide the presentation subset 634 of the search results 624 to include a series of results that have consecutive rankings In an example embodiment, the initial subset of the search results is configured to cause the initial social search results to be displayed in a grid that includes multiple columns. In an example implementation, configuration logic 620 configured the initial subset 626 of the search results 624 to cause the initial social search results 630, the re-ranked initial social search results 654, or the configured initial social search results 658 to be displayed in a grid that includes multiple columns.

In an aspect of the aforementioned embodiment, a determination may be made that each of the initial social search results includes an image of a user that is associated with that social search result. In accordance with this aspect, the initial subset may be configured in response to a determination that each of the social search results includes an image of a user that is associated with that social search result. In an example implementation, image determination logic 618 determines that each of the initial social search results 630 or the re-ranked initial social search results 654 includes an image of a user that is associated with that social search result. Image determination logic 618 may generate a configuration instruction 646 based on each of the initial social search results 630 or the re-ranked initial social search results 654 including such an image. Configuration instruction 646 instructs configuration logic 620 to configure the initial subset 626 of the search results 624 to cause the configured initial social search results 658 to be displayed in a grid that includes multiple columns. Configuration logic 620 may configure the initial subset 626 of the search results 624 to cause the configured initial social search results 658 to be displayed in a grid that includes multiple columns in response to receipt of the configuration instruction 646.

In some example embodiments, one or more steps 502, 504, 506, 508, 510, 512, 514, 516, and/or 518 of flowchart 500 may not be performed. Moreover, steps in addition to or in lieu of steps 502, 504, 506, 508, 510, 512, 514, 516, and/or 518 may be performed.

It will be recognized that social search logic 600 may not include one or more of subset determination logic 602, social determination logic 604, selection logic 606, combination logic 608, comparison logic 610, ranking logic 612, extraction logic 614, update logic 616, image determination logic 618, configuration logic 620, and/or consecutive determination logic 660. Furthermore, social search logic 600 may include logic in addition to or in lieu of subset determination logic 602, social determination logic 604, selection logic 606, combination logic 608, comparison logic 610, ranking logic 612, extraction logic 614, update logic 616, image determination logic 618, configuration logic 620, and/or consecutive determination logic 660.

Search engine module 108, social search logic 110, determination logic 402, social determination logic 404, selection logic 406, combination logic 408, comparison logic 410, ranking logic 412, extraction logic 414, update logic 416, image determination logic 418, configuration logic 420, subset determination logic 602, social determination logic 604, selection logic 606, combination logic 608, comparison logic 610, ranking logic 612, extraction logic 614, update logic 616, image determination logic 618, configuration logic 620, and consecutive determination logic 660 may be implemented in hardware, software, firmware, or any combination thereof.

For example, search engine module 108, social search logic 110, determination logic 402, social determination logic 404, selection logic 406, combination logic 408, comparison logic 410, ranking logic 412, extraction logic 414, update logic 416, image determination logic 418, configuration logic 420, subset determination logic 602, social determination logic 604, selection logic 606, combination logic 608, comparison logic 610, ranking logic 612, extraction logic 614, update logic 616, image determination logic 618, configuration logic 620, and/or consecutive determination logic 660 may be implemented as computer program code configured to be executed in one or more processors.

In another example, search engine module 108, social search logic 110, determination logic 402, social determination logic 404, selection logic 406, combination logic 408, comparison logic 410, ranking logic 412, extraction logic 414, update logic 416, image determination logic 418, configuration logic 420, subset determination logic 602, social determination logic 604, selection logic 606, combination logic 608, comparison logic 610, ranking logic 612, extraction logic 614, update logic 616, image determination logic 618, configuration logic 620, and/or consecutive determination logic 660 may be implemented as hardware logic/electrical circuitry. For instance, in an embodiment, one or more of search engine module 108, social search logic 110, determination logic 402, social determination logic 404, selection logic 406, combination logic 408, comparison logic 410, ranking logic 412, extraction logic 414, update logic 416, image determination logic 418, configuration logic 420, subset determination logic 602, social determination logic 604, selection logic 606, combination logic 608, comparison logic 610, ranking logic 612, extraction logic 614, update logic 616, image determination logic 618, configuration logic 620, and/or consecutive determination logic 660, flowchart 200, flowchart 300, and/or flowchart 500 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 7:
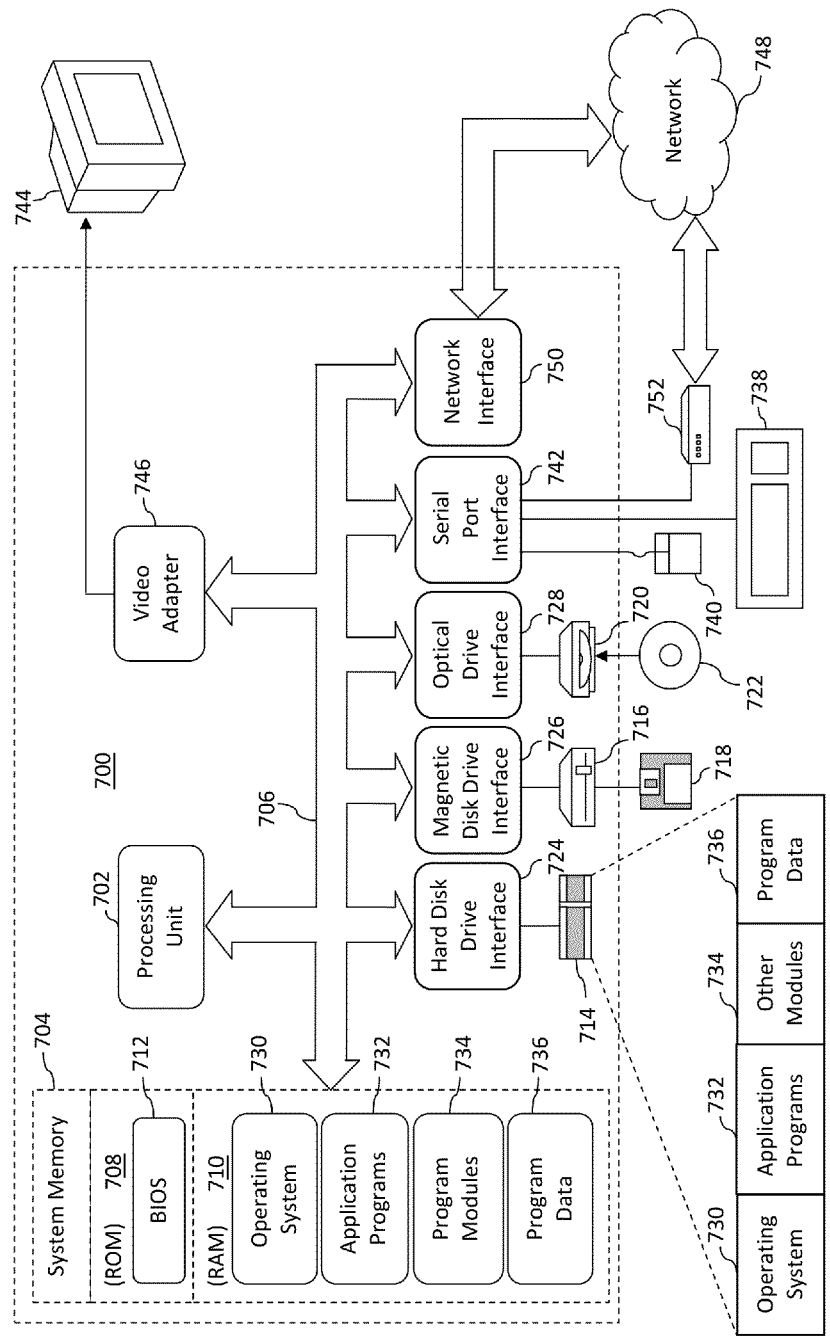
FIG. 7 depicts an example computer in which embodiments may be implemented.

FIG. 7 depicts an example computer 700 in which embodiments may be implemented. Any one or more of the user systems 102A-102M or the servers 106A-106N shown in FIG. 1 (or any one or more subcomponents thereof shown in FIGS. 4 and 6) may be implemented using computer 700, including one or more features of computer 700 and/or alternative features. Computer 700 may be a general-purpose computing device in the form of a conventional personal computer, a mobile computer, or a workstation, for example, or computer 700 may be a special purpose computing device. The description of computer 700 provided herein is provided for purposes of illustration, and is not intended to be limiting. Embodiments may be implemented in further types of computer systems, as would be known to persons skilled in the relevant art(s).

As shown in FIG. 7, computer 700 includes a processing unit 702, a system memory 704, and a bus 706 that couples various system components including system memory 704 to processing unit 702. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710, A basic input/output system 712 (BIOS) is stored in ROM 708.

Computer 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 730, one or more application programs 732, other program modules 734, and program data 736. Application programs 732 or program modules 734 may include, for example, computer program logic for implementing search engine module 108, social search logic 110, determination logic 402, social determination logic 404, selection logic 406, combination logic 408, comparison logic 410, ranking logic 412, extraction logic 414, update logic 416, image determination logic 418, configuration logic 420, subset determination logic 602, social determination logic 604, selection logic 606, combination logic 608, comparison logic 610, ranking logic 612, extraction logic 614, update logic 616, image determination logic 618, configuration logic 620, consecutive determination logic 660, flowchart 200 (including any step of flowchart 200), flowchart 300 (including any step of flowchart 300), and/or flowchart 500 (including any step of flowchart 500), as described herein.

A user may enter commands and information into the computer 700 through input devices such as keyboard 738 and pointing device 740. Other input devices (not shown) may include a microphone, joystick, game pad, satellite dish, scanner, or the like. These and other input devices are often connected to the processing unit 702 through a serial port interface 742 that is coupled to bus 706, but may be connected by other interfaces, such as a parallel port, game port, or a universal serial bus (USB).

A display device 744 (e.g., a monitor) is also connected to bus 706 via an interface, such as a video adapter 746. In addition to display device 744, computer 700 may include other peripheral output devices (not shown) such as speakers and printers.

Computer 700 is connected to a network 748 (e.g., the Internet) through a network interface or adapter 750, a modem 752, or other means for establishing communications over the network. Modem 752, which may be internal or external, is connected to bus 706 via serial port interface 742.

As used herein, the terms "computer program medium" and "computer-readable medium" are used to generally refer to media such as the hard disk associated with hard disk drive 714, removable magnetic disk 718, removable optical disk 722, as well as other media such as flash memory cards, digital video disks, random access memories (RAMs), read only memories (ROM), and the like. Such computer-readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

As noted above, computer programs and modules (including application programs 732 and other program modules 734) may be stored on the hard disk, magnetic disk, optical disk. ROM, or RAM. Such computer programs may also be received via network interface 750 or serial port interface 742. Such computer programs, when executed or loaded, by an application, enable computer 700 to implement features of embodiments discussed herein. Accordingly, such computer programs represent controllers of the computer 700.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A method comprising:
determining an initial subset of a plurality of search results that are retrieved based on a search query, each search result in the initial subset having a relevance with regard to the search query that exceeds a relevance threshold;
determining that the initial subset includes one or more first social search results, each first social search result indicating information from a user profile on a social networking domain;
based on determining that the initial subset includes the one or more first social search results, selecting one or more second social search results from the plurality of search results based on each of the one or more second social search results indicating information from a user profile on a social networking domain, each second social search result having a relevance with regard to the search query that does not exceed the relevance threshold;
determining that a quantity of the one or more first social search results exceeds a designated threshold; and
based on the quantity of the one or more first social search results exceeding the designated threshold, combining a designated subset of the one or more second social search results and at least a portion of the initial subset that includes the one or more first social search results to provide a presentation subset of the plurality of search results that is to be presented to a user that is associated with the search query.

2. The method of claim 1, further comprising:
ranking the plurality of search results based on a relevance of each of the plurality of search results with respect to the search query to provide a plurality of rankings of the plurality of respective search results, a relatively greater ranking corresponding to a relatively greater relevance with respect to the search query, a relatively lower ranking corresponding to a relatively lower relevance with respect to the search query; and
determining that each second social search result in the designated subset has a ranking that is greater than a ranking threshold;
wherein combining the designated subset of the one or more second social search results and at least the portion of the initial subset that includes the one or more first social search results comprises:
combining the designated subset of the one or more second social search results and at least the portion of the initial subset that includes the one or more first social search results in response to determining that each second social search result in the designated subset has a ranking that is greater than the ranking threshold.

3. The method of claim 2, further comprising:
re-ranking each second social search result in the designated subset such that the second social search results in the designated subset and the one or more first social search results provide a series of results that have consecutive rankings.

4. The method of claim 1, further comprising:
configuring the presentation subset to cause the first and second social search results therein to be displayed in a grid that includes a plurality of columns.

5. The method of claim 4, further comprising:
determining that each of the first and second social search results in the presentation subset includes an image of a user that is associated therewith;
wherein configuring the presentation subset comprises:
configuring the presentation subset to cause the first and second social search results therein to be displayed in the grid in response to determining that each of the first and second social search results in the presentation subset includes an image of a user that is associated therewith.

6. The method of claim 1, further comprising:
extracting publicly available rich metadata from user profile pages that correspond to the first and second social search results in the presentation subset; and
updating the first and second social search results in the presentation subset to include the rich metadata.

7. The method of claim 1, further comprising:
configuring the presentation subset to cause at least two results from a combination of the first and second social search results in the presentation subset to be displayed in at least two respective columns of a grid.

8. A method comprising:
ranking a plurality of search results that are retrieved in response to a search query based on a relevance of each of the plurality of search results with respect to the search query to provide a plurality of rankings of the plurality of respective search results, a relatively greater ranking corresponding to a relatively greater relevance with respect to the search query, a relatively lower ranking corresponding to a relatively lower relevance with respect to the search query;
determining an initial subset of the plurality of search results, each search result in the initial subset having a ranking that exceeds a ranking threshold;
determining that the initial subset includes a plurality of social search results, each social search result indicating information from a user profile on a social networking domain, the plurality of social search results including at least a first subset and a second subset, the first subset including at least one first social search result having at least one respective first ranking of the plurality of rankings, the second subset including at least one second social search result having at least one respective second ranking of the plurality of rankings;
determining that the at least one first ranking and the at least one second ranking are not consecutive; and
increasing the at least one second ranking to be consecutive with the at least one first ranking in response to determining that the at least one first ranking and the at least one second ranking are not consecutive.

9. The method of claim 8, further comprising:
determining that a quantity of the plurality of social search results exceeds a designated threshold;
wherein increasing the at least one second ranking comprises:
increasing the at least one second ranking to be consecutive with the at least one first ranking further in response to determining that the quantity of the plurality of social search results exceeds the designated threshold.

10. The method of claim 8, further comprising:
determining that the at least one second ranking exceeds a second ranking threshold that is less than the first ranking threshold;
wherein increasing the at least one second ranking comprises:
increasing the at least one second ranking to be consecutive with the at least one first ranking further in response to determining that the at least one second ranking exceeds the second ranking threshold.

11. The method of claim 8, further comprising:
configuring the initial subset of the plurality of search results to cause the plurality of social search results to be displayed in a grid that includes a plurality of columns.

12. The method of claim 11, further comprising:
determining that each social search result in the plurality of social search results includes an image of a user that is associated with that social search result;
wherein configuring the initial subset of the plurality of search results comprises:
configuring the initial subset of the plurality of search results to cause the plurality of social search results to be displayed in the grid in response to determining that each social search result in the plurality of social search results includes an image of a user that is associated with that social search result.

13. The method of claim 8, further comprising:
extracting publicly available rich metadata from user profile pages that correspond to the plurality of social search results; and
updating the plurality of social search results to include the rich metadata.

14. The method of claim 8, further comprising:
in response to determining that the initial subset includes the plurality of social search results, selecting one or more additional social search results from the plurality of search results based on each of the one or more additional social search results indicating information from a user profile on a social networking domain, each additional social search result having a ranking that does not exceed the ranking threshold; and
combining a designated subset of the one or more additional social search results and at least a portion of the initial subset that includes the plurality of social search results to provide a presentation subset of the plurality of search results that is to be presented to a user that is associated with the search query.

15. The method of claim 14, further comprising:
determining that each additional social search result in the designated subset has a ranking that is greater than a second ranking threshold that is less than the first ranking threshold;
wherein combining the designated subset of the one or more additional social search results and at least the portion of the initial subset that includes the plurality of social search results comprises:
combining the designated subset of the one or more additional social search results and at least the portion of the initial subset that includes the plurality of social search results in response to determining that each additional social search result in the designated subset has a ranking that is greater than the second ranking threshold.

16. The method of claim 15, further comprising:
re-ranking each additional social search result in the designated subset such that the additional social search results in the designated subset and the plurality of social search results provide a series of results that have consecutive rankings.

17. A system comprising:
subset determination logic that includes electrical circuitry and is configured to determine an initial subset of a plurality of search results that are retrieved based on a search query, each search result in the initial subset having a relevance with regard to the search query that exceeds a relevance threshold;
social determination logic configured to determine whether the initial subset includes one or more first social search results, each first social search result indicating information from a user profile on a social networking domain;
selection logic configured to select one or more second social search results from the plurality of search results based on each of the one or more second social search results indicating information from a user profile on a social networking domain in response to a determination that the initial subset includes the one or more first social search results, each second social search result having a relevance with regard to the search query that does not exceed the relevance threshold;
combination logic configured to combine a designated subset of the one or more second social search results and at least a portion of the initial subset that includes the one or more first social search results to provide a presentation subset of the plurality of search results that is to be presented to a user that is associated with the search query; and
ranking logic configured to rank the plurality of search results based on a relevance of each of the plurality of search results with respect to the search query to provide a plurality of rankings of the plurality of respective search results, a relatively greater ranking corresponding to a relatively greater relevance with respect to the search query, a relatively lower ranking corresponding to a relatively lower relevance with respect to the search query,
the ranking logic further configured to re-rank each second social search result in the designated subset such that the second social search results in the designated subset and the one or more first social search results provide a series of results that have consecutive rankings.

18. The system of claim 17, further comprising:
extraction logic configured to extract publicly available rich metadata from user profile pages that correspond to the first and second social search results in the presentation subset; and
update logic configured to update the first and second social search results in the presentation subset to include the rich metadata.

19. The system of claim 17, further comprising:
configuration logic that configures the presentation subset to cause at least two results from a combination of the first and second social search results in the presentation subset to be displayed in at least two respective columns of a grid.

20. The system of claim 19, further comprising:
image determination logic configured to determine whether each of the first and second social search results in the presentation subset includes an image of a user that is associated therewith;
wherein the configuration logic configures the presentation subset to cause at least two results from the combination of the first and second social search results in the presentation subset to be displayed in the at least two respective columns of the grid in response to a determination that each of the first and second social search results in the presentation subset includes an image of a user that is associated therewith.

* * * * *